United States Patent
Gandiga

(10) Patent No.: US 11,586,228 B2
(45) Date of Patent: Feb. 21, 2023

(54) ENHANCED DRONE VEHICLE INTEGRATION AND CONTROLS

(71) Applicant: Ford Global Technologies, LLC, Dearborn, MI (US)

(72) Inventor: Sandeep Raj Gandiga, Mountain House, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 16/654,144

(22) Filed: Oct. 16, 2019

(65) Prior Publication Data

US 2021/0116942 A1    Apr. 22, 2021

(51) Int. Cl.
  *G05D 1/10* (2006.01)
  *B64C 39/02* (2006.01)
  *B60P 3/11* (2006.01)
  *G05D 1/00* (2006.01)

(52) U.S. Cl.
  CPC ............... *G05D 1/106* (2019.05); *B60P 3/11* (2013.01); *B64C 39/024* (2013.01); *G05D 1/0011* (2013.01); *B64C 2201/027* (2013.01); *B64C 2201/08* (2013.01); *B64C 2201/208* (2013.01)

(58) Field of Classification Search
  None
  See application file for complete search history.

(56) References Cited

U.S. PATENT DOCUMENTS

| 9,625,904 | B2 | 4/2017 | Lamm et al. |
| 9,977,431 | B2 | 5/2018 | Lockwood et al. |
| 10,762,809 | B1* | 9/2020 | DeLorean .............. G08G 1/042 |
| 2017/0139420 | A1* | 5/2017 | Lockwood ........... G05D 1/0088 |
| 2020/0186964 | A1* | 6/2020 | Lekutai ................... H04W 4/44 |
| 2020/0334453 | A1* | 10/2020 | Thomas ............. G06K 9/00838 |
| 2020/0349852 | A1* | 11/2020 | DiCosola .......... G06Q 10/0832 |

FOREIGN PATENT DOCUMENTS

| WO | 2017213621 A1 | 12/2017 | |
| WO | WO-2020087104 A1 * | 5/2020 | ............. B65D 85/68 |

OTHER PUBLICATIONS

Mew Autonomous Technology Allows UGVs to Cooperate with Drones—USTEXPO Unmanned System Technology, May 2017, Mike Rees (nine pages).

Robo-Cars with Helper Drones are Joining Dubai's Police Force—Ostaw Digital/You Tube, Jul. 2, Alexi McCammond (two pages).

\* cited by examiner

*Primary Examiner* — Thomas E Worden
(74) *Attorney, Agent, or Firm* — Brandon Hicks; Eversheds Sutherland (US) LLP

(57) ABSTRACT

Systems, methods, and computer-readable media are disclosed for drone vehicle integration and controls. A vehicle device for controlling an unmanned aerial vehicle (UAV) may receive an input indicating a request to deploy the UAV from a vehicle. The vehicle device may determine that one or more deployment conditions are satisfied. The vehicle device may cause deployment of the UAV. The vehicle device may determine a control command for the UAV and a vehicle instruction associated with operating the UAV. The vehicle device may determine that the vehicle instruction has been satisfied, and may send the control command once the vehicle instruction is satisfied.

20 Claims, 6 Drawing Sheets

ENHANCED DRONE VEHICLE INTEGRATION AND CONTROLS

TECHNICAL FIELD

The present disclosure generally relates to devices, systems, and methods for controlling drones and, more particularly, to enhanced drone vehicle integration and controls.

BACKGROUND

Unmanned aerial vehicles (e.g., drones) are used for a variety of functions. As the capabilities of drones improve, the use applications of drones may increase.

DETAILED DESCRIPTION

Figure 1:
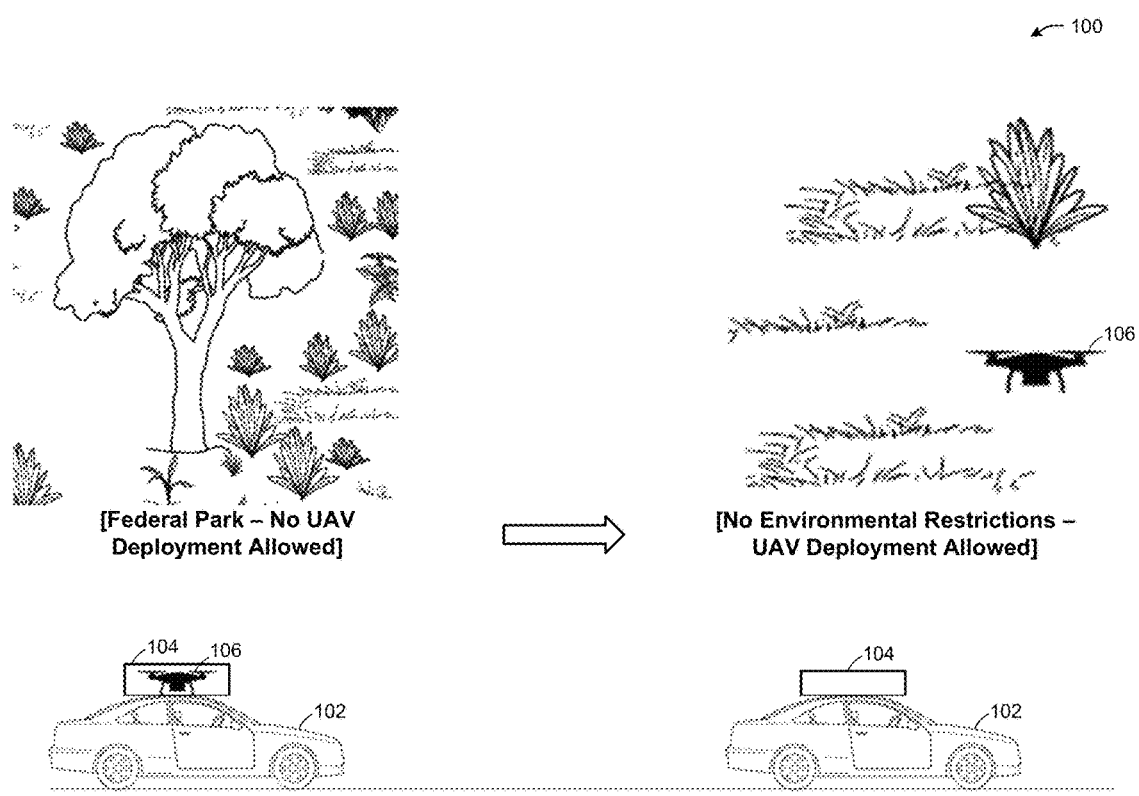
FIG. 1 is an illustration of an example implementation of drone vehicle integration and controls, in accordance with one or more embodiments of the disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Unmanned aerial vehicles (UAVs) such as drones may be used in search and rescue operations, policing operations, facilities monitoring, delivery services, agricultural processes, construction processes, surveillance and monitoring operations, and other applications. As UAV capabilities improve and regulations become more friendly to commercial use of UAVs, the use of drones is likely to grow.

One growing area of drone applications is the integration of UAVs with automotive vehicles such as cars, trucks, vans, and other movable machines. Vehicle integration of UAVs, however, carries safety concerns and may face regulations. For example, safety concerns may include whether a driver may control both a moving vehicle and a UAV at the same time, whether it is safe to deploy UAVs in certain environmental conditions, and whether safety regulations (e.g., Federal Aviation Administration regulations) may be obeyed while deploying UAVs. Restrictions regarding areas such as airports, populated areas, and environmentally protected areas may be a concern.

In vehicle-integrated UAV systems, a vehicle-based UAV deployment system (e.g., an in-vehicle computer) may be unable to determine whether a proper user is attempting UAV deployment, whether the vehicle is in a safe state to allow for UAV deployment, whether the surrounding environment is safe for UAV deployment, and whether regulations allow for UAV deployment, for example. As a result, a vehicle-based UAV system may deploy a UAV based on user commands even when a UAV should not be deployed. Such unwarranted deployment may result in safety risks, risks to the UAV and/or UAV deployment systems, and regulatory violations, for example.

It may therefore be beneficial to provide enhanced systems, methods, and devices for facilitating safe deployment of UAVs using vehicle-integrated UAV systems.

Example embodiments of the present disclosure relate to devices, systems, and methods for safe UAV deployment using vehicle-integrated UAV systems.

In one or more embodiments, a solution is provided to address the ways that UAVs and automotive vehicles may be integrated safely, allowing the UAV to be controlled utilizing a vehicle's in-car computer system, for example, and allowing operation of a UAV to be activated autonomously, but only when it is safe to do so, taking into consideration regulations and other variables.

In one or more embodiments, an in-vehicle computer may provide most of the computing power for a vehicle-integrated UAV deployment system, thereby minimizing the need for additional host computers and computer hardware, which may add complexity.

In one or more embodiments, UAV deployment safety may be determined by an in-vehicle computer based on input received from a UAV, a roof/garage control module for storing the UAV on or within a vehicle, a locking mechanism control module for controlling the docking and storage of the UAV, vehicle speed data (e.g., indicative of whether a vehicle is stopped or moving at a given speed), location data (e.g., which may be compared to known restricted areas for UAV deployment), UAV data, environmental data, and data from vehicle sensors. The in-vehicle computer may receive data from a cloud server, such as weather information, airspace restrictions (e.g., controlled or uncontrolled airspace), geographical restrictions, and user permissions (e.g., does a user have permission to fly a UAV in a particular location or airspace). Such data may be considered before launching a UAV to determine whether conditions are suitable for a launch, and may be considered during flight. For example, if a UAV launches in an unrestricted and safe area, but a user directs the UAV to a restricted area, the in-vehicle computer may receive an indication that the UAV is entering an unsafe and/or restricted area and may prompt the user to redirect the UAV or may command the UAV automatically.

In one or more embodiments, a vehicle-integrated UAV system may include a vehicle or machine with an in-vehicle computer (e.g., an infotainment system, sync, or the like), an in-vehicle roof or garage for UAV storage and docking, and the UAV itself. A landing/launching pad may be included in the UAV system. For example, the landing/launching pad may be located on an exterior of a vehicle (e.g., the roof) and within a garage or other enclosure on the vehicle's roof. The landing/launching pad may be on or within a portion of the vehicle.

In one or more embodiments, a user/driver enters a desire to fly a UAV by inputting one or more input commands into an in-vehicle computer, which may present a graphical user interface capable of receiving user inputs such as button pushes, gestures, voice commands, or electrical signals. The in-vehicle computer system may determine whether the user/driver may deploy a UAV from the vehicle by considering one or more factors. For example, the in-vehicle computer system may communicate with an integrated UAV control module, a roof/garage control module, and/or other modules in the in-vehicle computer system to determine vehicle speed, location data, UAV data, and data from various sensors integrated into the vehicle, and to control the UAV and roof/garage. The in-vehicle computer system may connect to the UAV, the UAV garage/roof, and components on the vehicle either wirelessly or through a wired connection. The in-vehicle computer system may also communicate wirelessly with one or more external devices (e.g., servers) to request and receive information such as environmental data, weather, airspace restrictions, geographic restrictions, and flight regulations, for example. One or more remote cloud servers may provide weather information (e.g., rain, fog, clouds, thunderstorms, wind, temperature, and other details at all altitudes of UAV operation). The in-vehicle computer also may communicate with one or more cloud servers to determine if a user has sufficient permission from any respective authority to fly a UAV in a controlled airspace. For example, the in-vehicle computer may prompt a user for an identity and/or for sufficient permissions. The in-vehicle computer may rely on the user's input to determine whether the user has sufficient permission to fly a UAV in a given area, or may send the user's identity to the one or more servers for permission verification. Based on the information identified by the in-vehicle computer, the in-vehicle computer may determine whether UAV deployment is allowed, and under what deployment conditions.

In one or more embodiments, the in-vehicle computer may communicate the answer to a user request for UAV deployment, for example, by displaying information on a graphical user interface, playing audio or video, or the like. A user may provide one or more inputs to the in-vehicle computer indicating a request to launch the UAV. If the in-vehicle computer determines that UAV deployment is allowed and under what deployment conditions, the in-vehicle computer may indicate such to the user and may provide signals to the UAV and the roof/garage to cause deployment of the UAV. Alternatively, the roof/garage may be opened and closed by manual commands entered via the in-vehicle computer. The in-vehicle computer may request and receive indications from the roof/garage to confirm that the roof/garage is in proper condition for UAV landing or deployment.

In one or more embodiments, the in-vehicle computer may allow an automated solution from the time at which a user enters an input into the in-vehicle computer indicating a request to fly the UAV. Such automation may provides a way for UAVs to be used without the need for a driver in the future (e.g., a UAV may be deployed from an autonomous vehicle lacking a human driver).

In one or more embodiments, the UAV may be integrated into a vehicle. For example, the UAV and any associated docking, launching, and landing components may be connected mechanically and/or electronically to a vehicle with a roof/garage. The integration may include a wired network (e.g., a controller area network or automotive Ethernet) and/or a wireless connection (e.g., Wi-Fi, Bluetooth, peer-to-peer, etc.).

In one or more embodiments, the in-vehicle computer may monitor the status of the UAV, the garage/roof, the vehicle, and the surrounding environment. For example, an infotainment system or sync may request and/or receive data from vehicle sensors, user devices, remote servers, the roof/garage, and the drone to maintain status information related to the UAV deployment system. Features of the roof module may be connected to a network, and their status may be monitored (e.g., is the roof open/closed, locked, etc.). The number of roof module features monitored may depend on the type of roof module used and/or on which features need to be invoked to guarantee a safe takeoff or landing operation. Features of a drone locking mechanism may be connected to a network, and their status may be monitored (e.g., if locked/unlocked, etc.). The number of drone locking features monitored may depend on the locking mechanism used, and which features need to be invoked to guarantee safe operation of the UAV. A UAV battery charge status may be connected to a network, and a UAV's charge capacity may be monitored (e.g., so that UAV power may be compared to a charge required for a flight). The in-vehicle computer may determine when to start and stop charging the UAV, or a user may provide commands to start and stop UAV charging. The required power for a UAV deployment may be based on UAV manufacturer's manual and manually entered into the in-vehicle computer and/or stored in the in-vehicle computer. Required UAV power for a given deployment also may be determined based on one or more inputs indicating a requested use of the UAV, based on historical use of the UAV (e.g., as stored locally or remotely), based on environmental conditions, wireless signal and network capabilities, and/or based on the type of UAV. The in-vehicle computer may determine if a flight is allowed and/or should be restricted, or if there is sufficient power to allow a requested flight.

In one or more embodiments, the in-vehicle computer may allow a driver or passenger of a vehicle to control a UAV from the vehicle. For example, a human operator in a vehicle may use the in-vehicle computer to control the launch or landing from the vehicle, to send navigation instructions to the UAV (e.g., up, down, left, right, front, back), to control UAV cameras (e.g., pan/yaw, tilt, zoom, record, switching between cameras such as multiple color, infrared, and night vision), and to command the UAV to follow the vehicle or any other vehicle or machine. The in-vehicle computer may prompt a user to input whether the user is a passenger or driver. If the user inputs that the user is a driver, then the in-vehicle computer may not allow for drone takeoff or landing under any circumstances, or may require the vehicle to be stopped/parked. If the user inputs that the user is a passenger, the in-vehicle computer may allow the passenger to control the UAV under deployment conditions determined to be compliant. The in-vehicle computer may indicate (e.g., display or output) deployment conditions for proper use of the UAV. The in-vehicle computer may receive indications from seat sensors indicating that one or more people are in the vehicle and in which seats. For example, the seat sensors may indicate that a driver is in the driver seat and that a passenger is in a front passenger seat. The in-vehicle computer may cause presentation of a seatbelt warning.

In one or more embodiments, the in-vehicle computer may autonomously control a UAV. For example, the in-vehicle computer may cause takeoff and landing of a UAV under certain deployment conditions without user input. The in-vehicle computer may control a UAV in flight without user input based on predetermined deployment conditions even if the UAV was launched in response to a user input, for example.

In one or more embodiments, the in-vehicle computer may inform a driver or passenger of a vehicle when the vehicle may be driven to a location and under what deployment conditions when the UAV is secured to the vehicle or when the UAV is in flight. For example, a vehicle's movement and operation may be restricted to allow for UAV launch or landing. Once a UAV has launched or become secured to the vehicle (e.g., directly or indirectly), the in-vehicle computer may indicate to a driver when the vehicle may be driven.

In one or more embodiments, the in-vehicle computer may provide location information (e.g., Global Positioning System data) of the vehicle and/or UAV. Using location information of the vehicle, the in-vehicle computer may determine whether the vehicle is in an area in which a UAV may be launched, and under what deployment conditions. For example, if the in-vehicle computer recognizes that the vehicle is near an airport, populated area, national park, or other areas associated with flight restrictions, the in-vehicle computer may prevent UAV takeoff or flying over such an area, or may restrict UAV flight based on the restrictions associated with the area.

In one or more embodiments, the in-vehicle computer may monitor deployment conditions such as weather conditions and determine whether a UAV may be operated in given weather. For example, the in-vehicle computer may access stored weather conditions associated with a given type of UAV known to be allowed or not allowed for UAV operation. The in-vehicle computer may also communicate with a cloud server to receive weather data and/or restrictions. If the in-vehicle computer recognizes that weather is not suitable for UAV operation, the in-vehicle computer may prevent UAV operation until weather conditions change, or may restrict UAV operation based on weather parameters.

In one or more embodiments, the in-vehicle computer may monitor deployment conditions such as vehicle speed. For example, the in-vehicle computer may receive speed data from one or more sensors on the vehicle and may determine if a vehicle is moving at a speed suitable for UAV operation. If the vehicle is moving too fast, the in-vehicle computer may prevent UAV takeoff or landing until the speed of the vehicle reaches a suitable level. The in-vehicle computer may prompt a driver to drive within a speed limit (e.g., 25 mph or less) when UAV operation is in progress.

In one or more embodiments, the UAV roof/garage of a vehicle may release a drone for flight when the in-vehicle computer provides signals indicating to launch the UAV. The UAV roof/garage may connect to a vehicle network (e.g., CAN or automotive Ethernet) and may determine when a UAV may be launched or landed based on the deployment conditions determined to be suitable. For example, the in-vehicle computer may send UAV launch or landing commands to the UAV roof/garage, and the UAV roof/garage may determine whether to execute the commands based on the conditions of the vehicle and/or surrounding environment.

In one or more embodiments, the in-vehicle computer and/or UAV roof/garage may allow a UAV to launch and fly from a vehicle if any of the following deployment conditions are met: vehicle speed is at or below a certain level (e.g., the vehicle is stopped), the weather is suitable for UAV flight, the vehicle is not in a flight-restricted area, and other environmental and device conditions are met so that it is safe to fly the UAV. The in-vehicle computer may make use of in-vehicle sensors to detect presence/movement of people in and around the vehicle, and may deny drone operation as a safety concern until the launch space around the vehicle is clear.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is an illustration of an example implementation 100 of drone vehicle integration and controls, in accordance with one or more embodiments of the disclosure.

Referring to FIG. 1, a vehicle 102 may include a garage 104 for housing a UAV 106. The garage 104 may be integrated with a roof of the vehicle 102 to store the UAV 106 and/or secure the UAV 106 to the vehicle 102. The vehicle 102 may control the operation of the garage 104 for deployment and landing of the UAV 106.

If the vehicle 102 receives an indication that a driver or passenger of the vehicle intends to fly the UAV 106, then the vehicle 102 may determine whether to allow deployment of the UAV 106, and under what operating conditions of the vehicle 102. For example, as shown in FIG. 1, the vehicle 102 may be near a federal park where flight of the UAV 106 may not be allowed. The vehicle 102 may determine that the restriction associated with the nearby federal park does not permit the launching and operation of the UAV 106. Therefore, the vehicle 102 may not allow the UAV 106 to take off.

If the vehicle 102 determines that the vehicle 102 is at a location where deployment conditions are suitable to fly the UAV 106, the vehicle 102 may allow deployment and operation of the UAV 106. For example, the vehicle 102 may be at a location where UAV flight is allowed. If other deployment conditions related to the vehicle 102, the UAV 106, and/or the surrounding environment are suitable for UAV operation, the vehicle 102 may allow the UAV 106 to take off and be operated from the vehicle 102.

Figure 2:
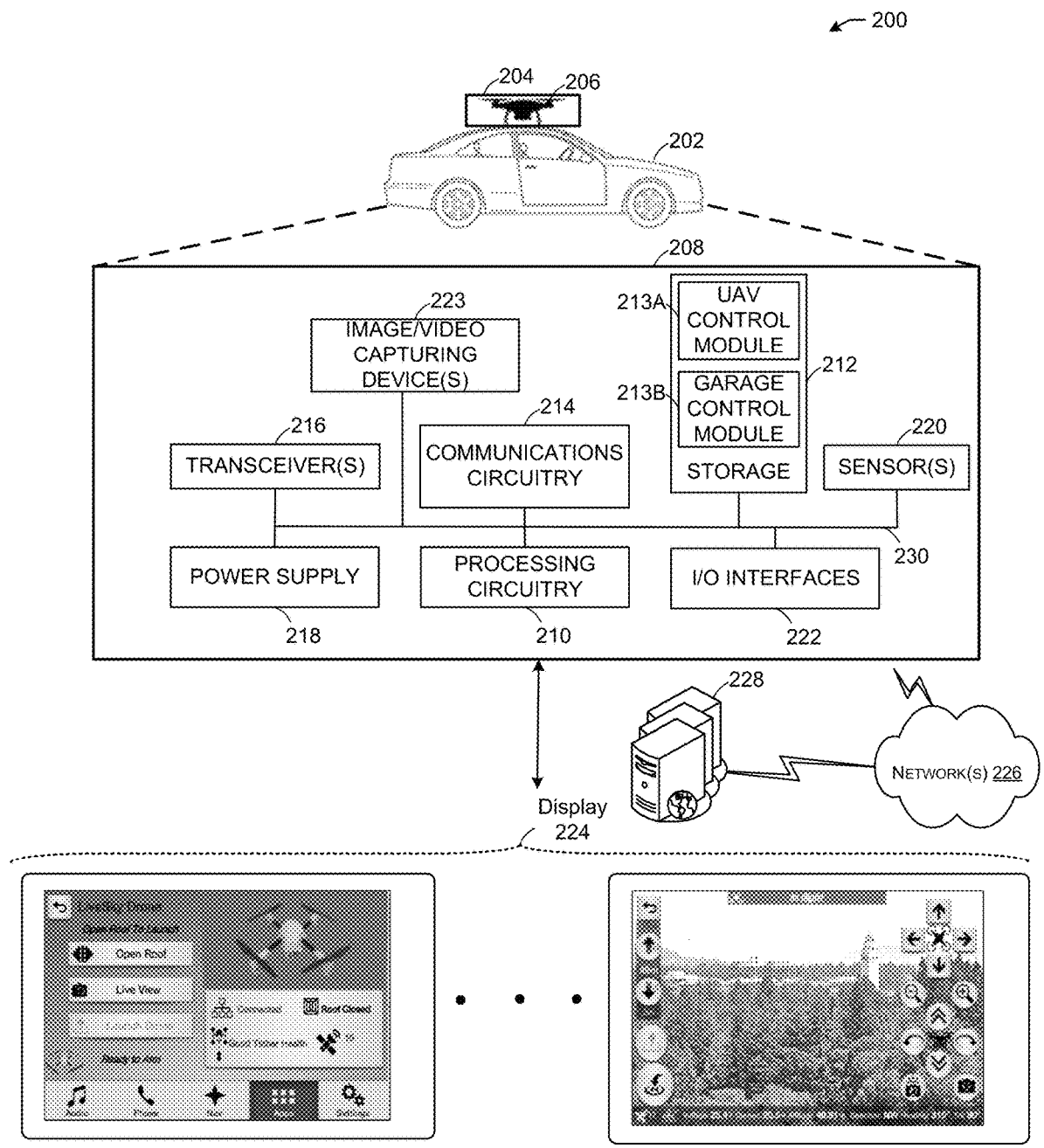
FIG. 2 depicts an illustrative vehicle drone control system, in accordance with one or more embodiments of the disclosure.

FIG. 2 depicts an illustrative vehicle drone control system 200, in accordance with one or more embodiments of the disclosure.

Referring to FIG. 2, a vehicle 202 may include a garage 204 for housing a UAV 206. The garage 204 may be integrated with a roof of the vehicle 202 to store the UAV 206 and/or secure the UAV 206 to the vehicle 202. The vehicle 202 may include an in-vehicle computer 208 which may control the operation of the garage 204 for deployment and landing of the UAV 206.

The in-vehicle computer 208 may have one or more components which may allow the vehicle 202 to control the garage 204 and the UAV 206. For example, the in-vehicle computer 208 may include processing circuitry 210, storage 212, a UAV control module 213A, a garage control module 213B, communications circuitry 214, a transceiver 216, a power supply 218, one or more sensors 220, one or more input/output (I/O) interfaces 222, and one or more image/video capturing devices 223. The in-vehicle computer 208 may include or be operatively connected to a display 224, and may communicate over a network 226 with one or more servers 228. The components of the in-vehicle computer 208 may connect through a bus 230. The in-vehicle computer 208 may be built into the vehicle 202, or may be a portable computer (e.g., a portable user device) such as a smartphone, tablet, laptop, or other mobile device capable of operatively coupling to the vehicle 202 and to any other vehicle.

In one or more embodiments, the UAV 206 and any additional UAVs (not shown) may be secured or locked in the vehicle 202 or inside the garage 204. The garage 204 may open and/or release the UAV 206 and any additional UAVs when the garage 204 receives one or more indications from the in-vehicle computer 208. For example, the in-vehicle computer 208 may cause display (e.g., on the display 224) of deployment and landing options for the UAV 206. If the in-vehicle computer 208 receives an indication (e.g., a user input from the display 224) that a driver or passenger of the vehicle 202 intends to fly the UAV 206, the in-vehicle computer 208 send one or more signals to the garage 204 to instruct the garage 204 to open and facilitate takeoff of the UAV 206 and any additional UAVs. The in-vehicle computer 208 may send one or more signals to the UAV 206 and any additional UAVs to facilitate takeoff, flight control, and landing of the UAV 206 and any additional UAVs. The communication between the in-vehicle computer 208, the garage 204, and the UAV 206 may be wired or wireless (e.g., an in-vehicle network).

In one or more embodiments, the in-vehicle computer 208 may receive one or more inputs from the display 224. The inputs may indicate that a user in the vehicle 202 intends to launch and operate the UAV 206, and whether the user is a driver or passenger. The in-vehicle computer 208 may execute instructions stored in the storage 212 to determine whether the UAV 206 may be deployed, and under what deployment conditions. The in-vehicle computer 208 may access the storage 212 to gather relevant information associated with the vehicle 202, the garage 204, the UAV 206, and the surrounding environment. The storage 212 may include information collected from the sensor(s) 220, the one or more servers 228, the garage 204, and the UAV 206. The in-vehicle computer 208 may determine criteria suitable for operation of the UAV 206, which may be pre-stored and/or updated based on received parameters and historical operation of the UAV 206. The storage 212 may store one or more modules such as the UAV control module 213A and the garage control module 213B used to control storage, deployment, operation, and landing of the UAV, and to control the operation of a roof/garage. For example, the in-vehicle computer 208 may use the UAV control module 213A to communicate with the UAV 206. The UAV control module 213A may include instructions for controlling operations of the UAV 206. The in-vehicle computer 208 may use the garage control module 213B to communicate with the garage 204 to send and receive commands. Other control modules may be stored in the storage 212 to facilitate communications and operations with the vehicle 202 and external devices such as the one or more servers 228.

In one or more embodiments, if the in-vehicle computer 208 determines that deployment conditions are not suitable for the UAV 206, then the in-vehicle computer 208 may provide an indication on the display 224 that the UAV 206 may not be operated under the current conditions, and the in-vehicle computer 208 may prompt a user via output on the display 224 to operate the vehicle 202 according to parameters which would allow for operation of the UAV 206 (e.g., the in-vehicle computer 208 may cause a display on the display 224 indicating that the vehicle 202 must be stopped before the UAV 206 may deploy and may prompt a user to drive under a speed limit while the UAV 206 is deployed). If the in-vehicle computer 208 determines that the UAV 206 may deploy based on the operating and/or environmental conditions, the in-vehicle computer 208 may send one or more signals to the garage 204 and/or the UAV 206 to cause deployment of the UAV 206. The in-vehicle computer 208 may receive signals from the garage 204 and/or the UAV 206 regarding their respective statuses, which may be used to determine whether the UAV 206 may be allowed to launch or land.

The processing circuitry 210 may be configured to execute computer-executable instructions. For example, the processing circuitry 210 may be configured to execute computer-executable instructions of various program module(s), applications, engines, or the like to cause or facilitate various operations to be performed in accordance with one or more embodiments of the disclosure. The processing circuitry 210 may include any suitable processing unit capable of accepting data as input, processing the input data in accordance with stored computer-executable instructions, and generating output data. The processing circuitry 210 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 210 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 210 may be capable of supporting any of a variety of instruction sets.

The storage 212 may include removable storage and/or non-removable storage including, but not limited to, magnetic storage, optical disk storage, and/or tape storage. The storage 212 may provide non-volatile storage of computer-executable instructions and other data. The storage 212, removable and/or non-removable, is an example of computer-readable storage media (CRSM) as that term is used herein.

The storage 212 may store computer-executable code, instructions, or the like that may be executable by the processing circuitry 210 to cause the processing circuitry 210 to perform or initiate various operations. The storage 212 may additionally store data that may be copied for use by the processing circuitry 210 during the execution of the computer-executable instructions. Moreover, output data generated as a result of execution of the computer-executable instructions by the processing circuitry 210 may be copied to the storage 212 for non-volatile storage. The storage 212 also may include one or more embedded multimedia cards (eMMCs) and/or secure digital (SD) cards.

More specifically, the storage 212 may store one or more program module(s), applications, engines, computer-executable code, scripts, or the like. Some or all of these module(s) may be or include sub-module(s). Any of the components depicted as being stored in the storage 212 may include any combination of software, firmware, and/or hardware. The software and/or firmware may include computer-executable code, instructions, or the like that may executed by one or more of the processing circuitry 210. Any of the components depicted as being stored in the storage 212 may support the functionality described in reference to the corresponding components named earlier in this disclosure.

The storage 212 may further store various types of data utilized by the components of the in-vehicle computer 208. Any data stored in the storage 212 may be used by the processing circuitry 210 in executing computer-executable code. In addition, any data depicted as being stored in the storage 212 may potentially be stored in one or more datastore(s). The datastore(s) may include, but are not limited to, databases (e.g., relational, object-oriented, etc.), file systems, flat files, distributed datastores in which data is stored on more than one node of a computer network, peer-to-peer network datastores, or the like.

The storage 212 may include information associated with the UAV 206. For example, the storage 212 may store UAV specifications and parameters based on UAV models, types, or brands. The operating parameters for the UAV 206 may be at least partially determined based on the information associated with the UAV 206 stored in the storage 212. The storage 212 may also store information and parameters associated with the vehicle 202 and the garage 204. Such stored information may be used by the in-vehicle computer 208 to determine whether and how to deploy the UAV 206. The storage 212 may store historical information with respect to the vehicle 202, the garage 204, and the UAV 206 or other UAVs. The historical information may include operating parameters related weather, previous flight patterns, location data, power data, current, voltage, signal strength between the in-vehicle computer 208 and the UAV 206, distance of the UAV 206 from the vehicle 202 from previous operations, captured images and video from the UAV 206, and the like. The information stored in storage 212 may allow the in-vehicle computer 208 to update and monitor parameters for allowing operation of the UAV 206. For example, stored data in the storage 212 may be used by the in-vehicle computer 208 to update the conditions suitable for operation of the UAV 206.

The in-vehicle computer 208 may further include communications circuitry 214 via which the in-vehicle computer 208 may communicate with any of a variety of other systems, platforms, networks, devices, and so forth. The in-vehicle computer 208 may further include communications circuitry 214, for example, with one or more wireless routers, one or more host servers, one or more web servers, and the like via one or more networks.

The transceiver(s) 216 may include any suitable radio component(s) for transmitting or receiving signals in the bandwidth and/or channels corresponding to the communications protocols utilized by the in-vehicle computer 208 to communicate with other devices. The transceiver(s) 216 may include hardware, software, and/or firmware for modulating, transmitting, or receiving communications signals according to any communication protocols. The transceiver(s) 216 may include any known receiver and baseband suitable for communicating via the communications protocols utilized by the in-vehicle computer 208. The transceiver(s) 216 may further include a low noise amplifier (LNA), additional power signal amplifiers (PA), an analog-to-digital (A/D) converter, one or more buffers, a digital baseband, or the like.

The power supply 218 may be a battery, such as a lithium-ion battery. The power supply 218 may be provided power from a power charging device such as a car battery. The power supply 218 may provide power to the in-vehicle computer 208, the garage 204, and the UAV 206. For example, the power supply 218 may provide power to the UAV 206 to charge the UAV 206 when the UAV 206 is in the garage 204 or otherwise operatively connected to the vehicle 202. The power supply 218 may be wired to the UAV 206 from the vehicle 202 (e.g., a tethered UAV).

The sensor(s) 220 may include sensors inside of or external to the vehicle 202. For example, the sensor(s) 220 may include vehicle speed sensors, other vehicle operation sensors, weather sensors, sensors associated with the garage 204 and/or the UAV 206, or the like. Data sensed by the sensor(s) 220 may be considered by the in-vehicle computer 208 to determine whether and how to launch, control, or land the UAV 206. If the in-vehicle computer 208 is in a mobile device, the sensor(s) 220 may be included in the mobile device.

The I/O interface(s) 222 may also include an interface for an external peripheral device connection such as universal serial bus (USB), micro-USB, FireWire, Thunderbolt, Ethernet port or other connection protocol that may connect to one or more networks. The I/O interface(s) 222 may also include a connection to the transceiver(s) 216 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The input/output (I/O) interface(s) 222 may facilitate the receipt of input information by the in-vehicle computer 208 from one or more I/O devices as well as the output of information from the in-vehicle computer 208 to the one or more I/O devices. The I/O devices may include any of a variety of components such as a display or display screen (e.g., display 224) having a touch surface or touchscreen; an audio output device for producing sound, such as a speaker; an audio capture device, such as a microphone; an image and/or video capture device, such as a camera; a haptic unit; and so forth. Any of these components may be integrated into the in-vehicle computer 208 or may be separate.

The one or more image/video capturing devices 223 may be any means used to capture images, video, and audio. For example, cameras, microphones, and other media capturing devices may be associated with the in-vehicle computer 208. The one or more image/video capturing devices 223 may capture images and videos which may be stored in the storage 212 or in plugged-in external memory (e.g., a USB pen drive). The captured images and video may be displayed on the display 224.

The display 224 may be, for example, an electrophoretic display, an electrowetting display, a liquid crystal display (LCD), an organic light-emitting diode, (OLED) display, or the like. The display 224 may have touch screen capabilities and may allow users to input information into the in-vehicle computer 208. For example, the display 224 may allow a user to request deployment of the UAV 206, and to indicate whether the user is a driver or passenger of the vehicle 202. The display 224 may present graphical user interfaces or human machine interfaces, and may show options for controlling the UAV 206, the garage 204, and the vehicle 202. For example, as shown in FIG. 2, the display 224 may display selectable commands to open a roof of the vehicle 202 (or the garage 204) and to launch the UAV 206 or any other UAV. The display 224 may indicate a connection status, a status of the UAV 206, and a status of a tether between the vehicle 202 and the UAV 206. When the UAV 206 is in flight, the display 224 may present selectable controls allowing users to navigate the UAV 206 and to capture images, video, or sound. The display 224 may show flight conditions such as altitude, direction, heading, and tilt, and may show the voltage and current of the UAV 206. The display 224 may display images and video captured by the UAV 206 and/or the in-vehicle computer 208 (e.g., based on a user input indicating a request or other inputs).

The in-vehicle computer 208 may communicate with the one or more servers 228 to send and receive data relevant to the operation of the UAV 206. The in-vehicle computer 208 and the one or more servers 228 may be configured to communicate with each other via a communications network 226 wirelessly or wired. The in-vehicle computer 208 may also communicate peer-to-peer or directly with each other with or without the one or more servers 228. When the UAV 206 is in flight and remote from the vehicle 202, the communications network 226 may allow for communication between the UAV 206 and the vehicle 202. The communications network 226 may allow the in-vehicle computer 208 to send control and/or status messages to the UAV 206, and the UAV 206 to send messages and data (e.g., images, video, flight status, environmental conditions, power level, etc.) to the in-vehicle computer 208.

The communications network 226 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 226 may have any suitable communication range associated therewith and may include, for example, global networks (e.g., the Internet), metropolitan area networks (MANs), wide area networks (WANs), local area networks (LANs), or personal area networks (PANs). In addition, the communications network 226 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The bus 230 may include at least one of a system bus, a memory bus, an address bus, or a message bus, and may permit the exchange of information (e.g., data (including computer-executable code), signaling, etc.) between various components of the in-vehicle computer 208. The bus 230 may include, without limitation, a memory bus or a memory controller, a peripheral bus, an accelerated graphics port, and so forth. The bus 230 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth. Although the bus 230 is shown in FIG. 2, other connections may be used for the components of the in-vehicle computer 208.

Figure 3:
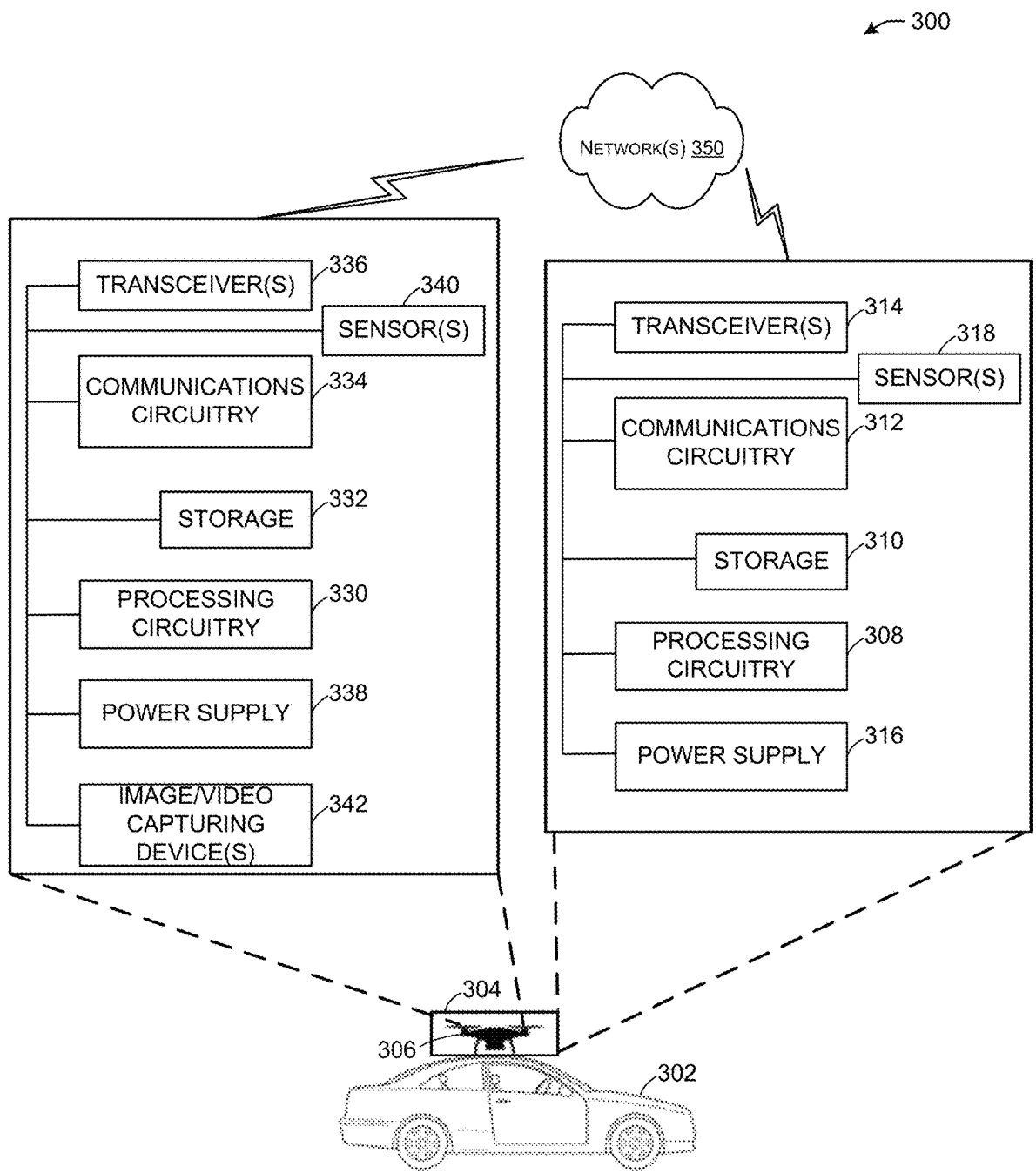
FIG. 3 depicts an illustrative vehicle drone control system, in accordance with one or more embodiments of the disclosure.

FIG. 3 depicts an illustrative vehicle drone control system 300, in accordance with one or more embodiments of the disclosure.

Referring to FIG. 3, a vehicle 302 may include a garage 304 for housing a UAV 306. The vehicle 302, the garage 304, and the UAV 306 may be similar to the vehicle 202, the garage 204, and the UAV 206, respectively, as described with regard to FIG. 2.

In one or more embodiments, the garage 304 and the UAV 306 may be operatively connected to the vehicle 302 (e.g., via the in-vehicle computer 208 of FIG. 2). The garage 304 and the UAV 306 may send signals to and receive signals from the vehicle 302. For example, the garage 304 may house the UAV 306 and may maintain a housing/secure status of the UAV 306. The garage 304 may include any form of partial or complete enclosure of the UAV 306, and may be part of or attached to any portion of the vehicle 302, such as a roof or other portion of the vehicle 302. The garage 304 may operate in different states, such as closed, open, opening, and closing. The garage 304 may provide indications of its operating state to the vehicle 302 at any time. For example, when the vehicle 302 receives an input to deploy the UAV 306, the vehicle 302 may send a signal requesting the status of the garage 304 and/or the UAV 306. The garage 304 and/or the UAV may send signals to the vehicle 302 indicating that the UAV 306 is ready for deployment. For example, the garage 304 may open and send a signal indicating that it is open. The UAV 306 may send a signal indicating that it is charged and ready to deploy. The garage 304 may facilitate deployment of the UAV 306 by opening and/or releasing the UAV 306.

In one or more embodiments, the vehicle 302 may control the UAV 306 once the UAV 306 has deployed from the vehicle 302. The garage 304 may close after deployment of the UAV 306, and may reopen upon a determination or request to land the UAV 306. The UAV 306 may send status information related to its operation to the vehicle 302, and may return the vehicle 302 upon command or a determination that landing is appropriate (e.g., power level too low). For example, the in-vehicle computer 208 of FIG. 2 may facilitate communication to cause deployment of the UAV 306, and may communicate with the UAV 306 while the UAV is in flight. Based on the information provided by the UAV 306 or other sources (e.g., the vehicle 302, the one or more servers 228 of FIG. 2), the in-vehicle computer 208 of FIG. 2 may command the UAV 306 to return to the garage 304. The return command may include one or more signals indicating a return location, which may be a current or future location of the vehicle 302. The garage 304 may be instructed by the in-vehicle computer 208 of FIG. 2 to reopen upon the return of the UAV 306 to facilitate landing.

The garage 304 may include one or more components which allow for storage of the UAV 306, communication with the vehicle 302 and with the UAV 306, and for operation of the garage 304 and the UAV 306. For example, the garage 304 may include processing circuitry 308, storage 310, communications circuitry 312, transceiver(s) 314, power supply 316, and sensor(s) 318.

The processing circuitry 308 may be configured to execute computer-executable instructions. For example, the processing circuitry 308 may be configured to execute computer-executable instructions of various program module(s), applications, engines, or the like to cause or facilitate various operations to be performed in accordance with one or more embodiments of the disclosure. The processing circuitry 308 may include any suitable processing unit capable of accepting data as input, processing the input data in accordance with stored computer-executable instructions, and generating output data. The processing circuitry 308 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 210 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 308 may be capable of supporting any of a variety of instruction sets.

The storage 310 may include removable storage and/or non-removable storage including, but not limited to, magnetic storage, optical disk storage, and/or tape storage. The storage 310 may provide non-volatile storage of computer-executable instructions and other data. The storage 310, removable and/or non-removable, is an example of computer-readable storage media (CRSM) as that term is used herein.

The storage 310 may store computer-executable code, instructions, or the like that may be executable by the processing circuitry 308 to cause the processing circuitry 308 to perform or initiate various operations. The storage 310 may additionally store data that may be copied for use by the processing circuitry 308 during the execution of the computer-executable instructions. Moreover, output data generated as a result of execution of the computer-executable instructions by the processing circuitry 308 may be copied to the storage 310 for non-volatile storage.

More specifically, the storage 310 may store one or more program module(s), applications, engines, computer-executable code, scripts, or the like. Some or all of these module(s) may be or include sub-module(s). Any of the components depicted as being stored in the storage 310 may include any combination of software, firmware, and/or hardware. The software and/or firmware may include computer-executable code, instructions, or the like that may executed by one or more of the processing circuitry 210. Any of the components depicted as being stored in the storage 310 may support the functionality described in reference to the corresponding components named earlier in this disclosure.

The storage 310 may include information associated with the garage 304 and the UAV 306. For example, the storage 310 may include information regarding whether the garage 304 is open or closed, whether the UAV 306 is housed and secured in the garage 304, power supply information, signal strength information, network information, and past usage information. The information stored in storage 310 may allow the in-vehicle computer 208 of FIG. 2 to update and monitor parameters for allowing operation of the garage 304 and UAV 306.

The communications circuitry 312 may allow the garage 304 to communicate with any of a variety of other systems, platforms, networks, devices, and so forth, such as the UAV 306 and the in-vehicle computer 208 of FIG. 2.

The transceiver(s) 314 may include any suitable radio component(s) for transmitting or receiving signals in the bandwidth and/or channels corresponding to the communications protocols utilized by the garage 304 to communicate with other devices. The transceiver(s) 314 may include hardware, software, and/or firmware for modulating, transmitting, or receiving communications signals according to any communication protocols. The transceiver(s) 314 may include any known receiver and baseband suitable for communicating via the communications protocols utilized by the garage 304. The transceiver(s) 314 may further include a low noise amplifier (LNA), additional power signal amplifiers (PA), an analog-to-digital (A/D) converter, one or more buffers, a digital baseband, or the like.

The power supply 316 may be a battery, such as a lithium-ion battery. The power supply 316 may be provided power received from a power charging device such as a car battery. The power supply 316 may provide power to the UAV 306.

The sensor(s) 318 may include sensors inside of or external to the garage 304. For example, the sensor(s) 340 may detect a presence of the UAV 306, whether the garage 304 is open or closed, signal strength, power of the garage 304 and the UAV 306, and the like. The communications circuitry 312 may facilitate communications between the UAV 306, the garage 304, and the vehicle 302. For example, the garage 304 may receive signals from the in-vehicle computer 208 of FIG. 2, and may provide status information of the garage 304 and the UAV 306.

The UAV 306 may include one or more components which allow for storage and deployment of the UAV 306, communication with the vehicle 306 and with the garage 304, and for operation of the UAV 306. For example, the UAV 306 may include processing circuitry 330, storage 332, communications circuitry 334, transceiver(s) 336, power supply 338, sensor(s) 340, and one or more image/video capturing devices 342.

The processing circuitry 330 may be configured to execute computer-executable instructions. For example, the processing circuitry 330 may be configured to execute computer-executable instructions of various program module(s), applications, engines, or the like to cause or facilitate various operations to be performed in accordance with one or more embodiments of the disclosure. The processing circuitry 308 may include any suitable processing unit capable of accepting data as input, processing the input data in accordance with stored computer-executable instructions, and generating output data. The processing circuitry 330 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processing circuitry 330 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing circuitry 308 may be capable of supporting any of a variety of instruction sets.

The storage 332 may include removable storage and/or non-removable storage including, but not limited to, magnetic storage, optical disk storage, and/or tape storage. The storage 332 may provide non-volatile storage of computer-executable instructions and other data. The storage 332, removable and/or non-removable, is an example of computer-readable storage media (CRSM) as that term is used herein.

The storage 332 may store computer-executable code, instructions, or the like that may be executable by the processing circuitry 330 to cause the processing circuitry 330 to perform or initiate various operations. The storage 332 may additionally store data that may be copied for use by the processing circuitry 330 during the execution of the computer-executable instructions. Moreover, output data generated as a result of execution of the computer-executable instructions by the processing circuitry 330 may be copied to the storage 332 for non-volatile storage.

More specifically, the storage 332 may store one or more program module(s), applications, engines, computer-executable code, scripts, or the like. Some or all of these module(s) may be or include sub-module(s). Any of the components depicted as being stored in the storage 332 may include any combination of software, firmware, and/or hardware. The software and/or firmware may include computer-executable code, instructions, or the like that may executed by one or more of the processing circuitry 330. Any of the components depicted as being stored in the storage 332 may support the functionality described in reference to the corresponding components named earlier in this disclosure.

The storage 332 may include information associated with the UAV 306 and the UAV 306. For example, the storage 332 may include information regarding whether the UAV 306 is housed and secured in the garage 304, power supply information, signal strength information, network information, past usage information, images from past usage, video from past usage, audio from past usage, operating parameters, type, make, and model, and the like. The information stored in storage 332 may allow the in-vehicle computer 208 of FIG. 2 to update and monitor parameters for allowing operation of the garage 304 and UAV 306.

The communications circuitry 334 may allow the UAV 306 to communicate with any of a variety of other systems, platforms, networks, devices, and so forth, such as the garage 304 and the in-vehicle computer 208 of FIG. 2.

The transceiver(s) 336 may include any suitable radio component(s) for transmitting or receiving signals in the bandwidth and/or channels corresponding to the communications protocols utilized by the UAV 306 to communicate with other devices. The transceiver(s) 336 may include hardware, software, and/or firmware for modulating, transmitting, or receiving communications signals according to any communication protocols. The transceiver(s) 336 may include any known receiver and baseband suitable for communicating via the communications protocols utilized by the UAV 306. The transceiver(s) 336 may further include a low noise amplifier (LNA), additional power signal amplifiers (PA), an analog-to-digital (A/D) converter, one or more buffers, a digital baseband, or the like.

The power supply 338 may be a battery, such as a lithium-ion battery. The power supply 338 may be provided power received from a power charging device such as a car battery. The power supply 338 may provide power to the garage 304 and the UAV 306. For example, the power supply 338 may receive power from the power supply 316 of the garage 304 to charge the UAV 306.

The sensor(s) 340 may include sensors inside of or external to the UAV 306. For example, the sensor(s) 340 may detect signal strength, power of the UAV 306, environmental conditions, operating conditions of the UAV 306, and the like. The communications circuitry 334 may facilitate communications between the UAV 306, the garage 304, and the vehicle 302. For example, the UAV 306 may receive signals from the in-vehicle computer 208 of FIG. 2, and may provide status information of the UAV 306. The signals received by the UAV 306 may cause the UAV 306 to deploy, fly, return, and land.

The image/video capturing device(s) 342 may include a camera for capturing images, video, and sound. The image/video capturing device(s) 342 may respond to inputs received by the UAV 306 from the vehicle 302 indicating requests to take pictures or video. The data captured by the image/video capturing device(s) 342 may be stored in the storage 332 and sent to the vehicle 302 while the UAV 306 is in flight or while the UAV 306 is stored in the garage 304.

The UAV 306 and the garage 304 may connect to and communicate with one another and/or the vehicle 302 via one or more communication networks 350. The one or more communication networks 350 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the one or more communication networks 350 may have any suitable communication range associated therewith and may include, for example, global networks (e.g., the Internet), metropolitan area networks (MANs), wide area networks (WANs), local area networks (LANs), or personal area networks (PANs). In addition, the communications network 350 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 4:
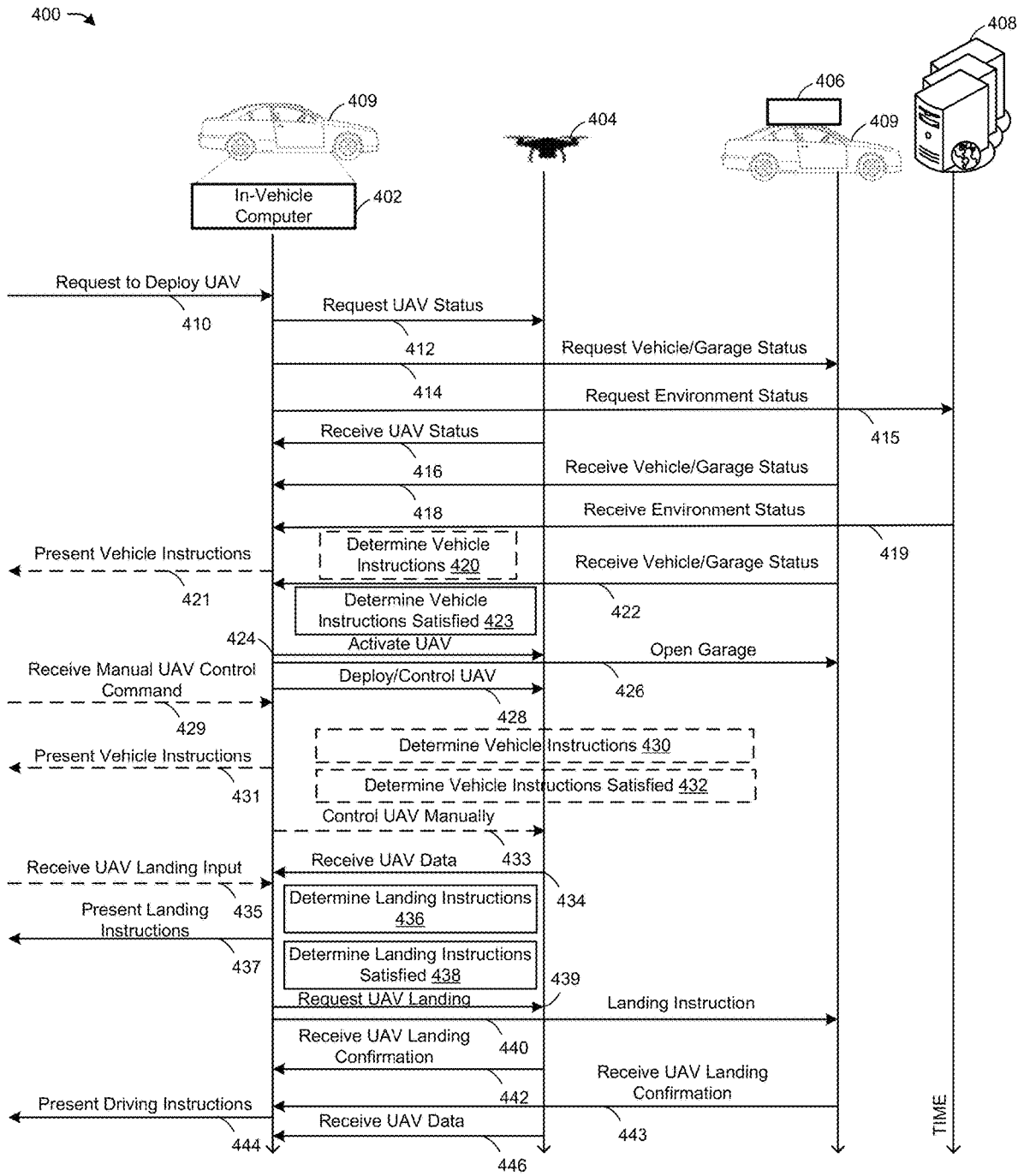
FIG. 4 illustrates a drone vehicle integration and controls process, in accordance with one or more embodiments of the disclosure.

FIG. 4 illustrates a drone vehicle integration and controls process 400, in accordance with one or more embodiments of the disclosure.

Referring to FIG. 4, an in-vehicle computer 402 (e.g., which may be similar to the in-vehicle computer 208 of FIG. 2) may be in communication with a UAV 404, a garage 406 for vehicle storage of the UAV 404 on a vehicle 409, and one or more servers 408. The drone vehicle integration and controls process 400 may facilitate storage, deployment, and landing of the UAV 404, control the garage 406, and control of the vehicle 409.

At step 410, the in-vehicle computer 402 may receive in input indicating a request to deploy the UAV 404. The input may be a touch, a gesture, a voice command, a wireless signal, or other type of input.

At step 412, the in-vehicle computer 402 may send a request for status of the UAV 404. The request may be sent to the UAV 404 and may include a request for power status of the UAV 404 and other parameters of the UAV 404 associated with an ability of the UAV 404 to fly. The request may be sent by accessing a UAV control module (e.g., UAV control module 213A of FIG. 2) and executing instructions associated with communication commands.

At step 414, the in-vehicle computer 402 may send a request for a status of the garage 406 and/or the UAV 404. The request may be sent to the garage 406 and the UAV 404, and may include a request for status of the garage 406 and the UAV 404. For example, the request may include a request for whether the UAV 404 is secured/connected in the garage 406 and whether the garage 406 is open or closed, whether the UAV 404 is charging, whether the UAV 404 is locked, or the like. The request may be sent by accessing a garage control module (e.g., garage control module 213B of FIG. 2) and executing instructions associated with communication commands.

At step 415, the in-vehicle computer 402 may send a request for a status of the environment. The request may include a request for weather information, location information, regulatory information and restrictions, and the like. The request may be sent to the one or more servers 408.

At step 416, the in-vehicle computer 402 may receive a status of the UAV 404, which may indicate whether or not the UAV 404 is present, charged, and ready to deploy. The status may indicate current, voltage, signal strength, and the quality of a tether if the UAV 404 is wired to the vehicle 409. The status may indicate whether the UAV 404 is locked or otherwise connected to the garage 406 or another portion of the vehicle 409.

At step 418, the in-vehicle computer 402 may receive a status of the UAV 404 and the garage 406. The status may indicate whether or not the UAV 404 is present, charged, and ready to deploy, and whether or not the garage 406 is ready to release the UAV 404 for takeoff.

At step 419, the in-vehicle computer 402 may receive an environmental status such as weather indications, environmental or flight restrictions, a type of area (e.g., urban, populated, rural, etc.).

In one or more embodiments, the in-vehicle computer 402 may consider any combination of information related to the UAV 404, the garage 406, the vehicle 409, and the environment to determine whether or not the UAV 404 may be deployed, and under what conditions. The information received in steps 412, 414, and 415 may be used to determine whether deployment conditions are satisfied for deployment of the UAV 404.

At step 420, the in-vehicle computer 402 may determine vehicle instructions associated with operating the vehicle. For example, the in-vehicle computer 402 may determine that the vehicle 409 is moving at a speed too fast for safe deployment of the UAV 404, or that the location of the vehicle 409 and the UAV 404 is in a restricted area or is associated with unsuitable weather. If the in-vehicle computer 402 determines that the deployment conditions are not satisfied for deployment and determines vehicle instructions to allow for deployment, then at step 421 the in-vehicle computer 402 may present vehicle instructions indicating what may be done to satisfy the deployment conditions. For example, if a deployment condition requires the vehicle 409 to slow down or stop, an indication of reduced speed may be presented by the in-vehicle computer 402.

At step 422, the in-vehicle computer 402 may receive a status of the vehicle 409 and/or the garage 406. The status may indicate that the vehicle 409 is operating at a particular speed or is in park, and that the garage 406 is open and has unlocked/unsecured the UAV 404 for deployment. If the in-vehicle computer 402 determines that the vehicle instructions have been satisfied at step 423, the in-vehicle computer 402 may determine that the deployment conditions are satisfied and that the UAV 404 is ready for deployment.

At step 424, the in-vehicle computer 402 may activate the UAV 404 for deployment. Activation may include sending one or more signals to the UAV 404 indicating that the UAV 404 is cleared for takeoff, and may include one or more signals establishing operating parameters, flight controls, location, and communication protocols for use during the operation of the UAV 404.

At step 426, the in-vehicle computer 402 may cause the garage 406 to open by sending one or more signals requesting the opening. The one or more signals may indicate a request to unlock or otherwise detach the UAV 404 from the garage 406 or another portion of the vehicle 409 to allow deployment. The one or more signals may cause the garage 406 to open and release the UAV 404. For example, the garage 406 may lock or fasten the UAV 404 inside of the garage 406 to secure the UAV 404. Using a garage control module (e.g., garage control module 213B of FIG. 2) and/or a UAV control module (e.g., UAV control module 213A of FIG. 2), the in-vehicle computer 402 may send one or more signals commanding the garage 406 to unlock and release the UAV 404.

At step 428, the in-vehicle computer 402 may deploy and the UAV 404 by sending one or more signals controlling the operation of the UAV 404. For example, using a UAV control module (e.g., UAV control module 213A of FIG. 2), the in-vehicle computer 402 may determine command signals used to indicate commands to the UAV 404. Command signals may include commands to move the UAV 404 in a direction, to change height or tilt of the UAV 404, to send information back to the in-vehicle computer 402, to control cameras on the UAV 404 (e.g., to capture images, video, or audio), to command the UAV 404 to follow the vehicle 409, and the like.

In one or more embodiments, the in-vehicle computer 402 may allow for manual control of the UAV 404. For example, a passenger or driver of the vehicle 409 may control the UAV 404 through the in-vehicle computer after the UAV 404 has deployed. The in-vehicle computer 402 may receive inputs associated with user commands to control the UAV 404. In step 429, for example, the in-vehicle computer 402 may receive one or more inputs indicating a user request for manual control of the UAV 404. Manual control may be associated with a manual flight mode of the UAV 404 rather than an automatic flight mode in which the in-vehicle computer 402 may autonomously control the flight of the UAV 404.

Upon receiving manual control commands for the UAV 404, the in-vehicle computer 402 may determine whether the vehicle 409 is operating under suitable conditions for manual control of the UAV 404. For example, for safety reasons, the vehicle 409 may need to be moving at or below a speed threshold or in park. At step 430, the in-vehicle computer 402 may determine vehicle instructions associated with operation of the vehicle 409 while the UAV 404 is in flight. At step 431, the in-vehicle computer 402 may cause presentation of the vehicle instructions, which may include an indication that the vehicle 409 needs to slow down or stop. Alternatively, the in-vehicle computer 402 may automatically cause the vehicle 409 to slow down or stop. At step 432, the in-vehicle computer 402 may determine that the vehicle instructions for manual control of the UAV 404 have been satisfied. For example, the in-vehicle computer 402 may determine that the vehicle 409 has slowed down to a proper speed or stopped.

At step 433, the in-vehicle computer 402 may send one or more command signals which may allow a user to manually control the UAV 404. For example, a user in the vehicle 409 may provide commands to the UAV 404 through the in-vehicle computer 402 to command the UAV 404 to move, to travel to particular locations, to capture images, video, and audio, and the like. The commands may request the UAV 404 to send data back to the in-vehicle computer 402. To send commands to the UAV 404, the in-vehicle computer 402 may use a UAV control module (e.g., UAV control module 213A of FIG. 2) to execute instructions to determine and send control commands. The control inputs may include directional movements, location coordinates to be implemented by the UAV 404, gestures or movements for the UAV 404 to implement, requests for recording and/or capture of video, images, and sounds (e.g., with image/video capturing device(s) 342 of FIG. 3), requests to return the UAV 404 for landing, and the like.

At step 434, the in-vehicle computer 402 may receive data from the UAV 404. For example, the UAV 404 may send information related to height, tilt, distance, location, signal strength, battery level, weather or other environmental information, images, video, sound, or the like. The in-vehicle computer 402 may store such data and may use such data to determine whether in-flight parameters for the UAV 404 should be altered (e.g., a course correction or request to land).

At step 435, the in-vehicle computer 402 may receive a UAV landing input or may determine that the UAV 404 needs to land. The landing input may include a desired destination for the UAV 404 to meet the vehicle 409, which may be the current location of the vehicle 409 or a future location. The in-vehicle computer 402 may determine a landing location in response to a landing request or indicator that the UAV 404 needs to land.

At step 436, the in-vehicle computer 402 may determine landing instructions for landing the UAV 404 in the garage 406 or otherwise on or in the vehicle 409. The landing instructions may include location, time, speed, and other relevant information instructing the UAV 404 where to be and when for landing. At step 437, the in-vehicle computer 402 may present the landing instructions. For example, the in-vehicle computer 402 may present directions for a driver regarding a location to drive, a vehicle speed, a landing time, and any operation which may be performed to facilitate landing of the UAV 404.

At step 438, the in-vehicle computer may determine that landing instructions have been satisfied. For example, to land the UAV 404, the vehicle 409 may need to operate at or below a certain speed, or be parked. The vehicle 409 may need to be in a particular location at a particular time, or on route to a particular location. Once the landing instructions have been satisfied, the in-vehicle computer 402 may send landing instructions to the UAV 404 and the garage 406, or the landing instructions may be sent before determining that the landing instructions have been satisfied. For example, at step 439, the in-vehicle computer 402 may use a UAV control module (e.g., UAV control module 213A of FIG. 2) to send one or more signals to the UAV 404 requesting that the UAV 404 return the vehicle 409. At step 440, the in-vehicle computer 402 may use a garage control module (e.g., garage control module 213B of FIG. 2B) to send one or more signals to the garage 406 to prepare the garage 406 for landing the UAV 404.

Once the UAV 404 has landed and been secured/locked in the garage 406, the in-vehicle computer 402 may determine that the vehicle 409 may return to normal driving. For example, to land the UAV 404, the in-vehicle computer 402 may require that the vehicle 409 come to a complete stop. Once the UAV 404 is secured in the garage 406, the in-vehicle computer may allow normal driving again. In step 442, the in-vehicle computer 402 may receive a landing confirmation of the UAV 404 from the UAV 404, and at step 443, the in-vehicle computer 402 may receive a landing confirmation of the UAV 404 from the garage 406 indicating that the UAV 404 is secured in the garage 406, for example.

After the UAV 404 has landed, the vehicle 409 may be allowed to drive normally. For example, the in-vehicle computer 402 at step 444 may cause presentation of driving instructions which may indicate that the vehicle is no longer under a speed restriction. At step 446, the in-vehicle computer may receive data from the UAV 404. The data received from the UAV 404 may indicate how much battery was used by the UAV 404 in flight, the distances and locations of the UAV 404, weather conditions (e.g., wind), velocity of the UAV 404, signal strength, recorded/captured media, and the like. The information received from the UAV 404 may be used to update operation parameters of the UAV 404 for future use. For example, a given distance or flight time associated with an amount of battery used may be a factor in determining whether the UAV 404 may be deployed for a future flight, and environmental conditions like wind may be used to consider whether it is safe for the UAV 404 to be deployed in similar conditions in the future.

In one or more embodiments, the in-vehicle computer 402 may display any combination of the status information related to the UAV 404, the garage 406, the vehicle 409, the environmental status, and the like. For example, the in-vehicle computer 402 may display a vehicle network status, an open/close status of the garage 406, altitude of a flight, UAV 404 heading, battery/power voltage/current, visible GPS satellites, video live stream, and the like.

Figure 5:
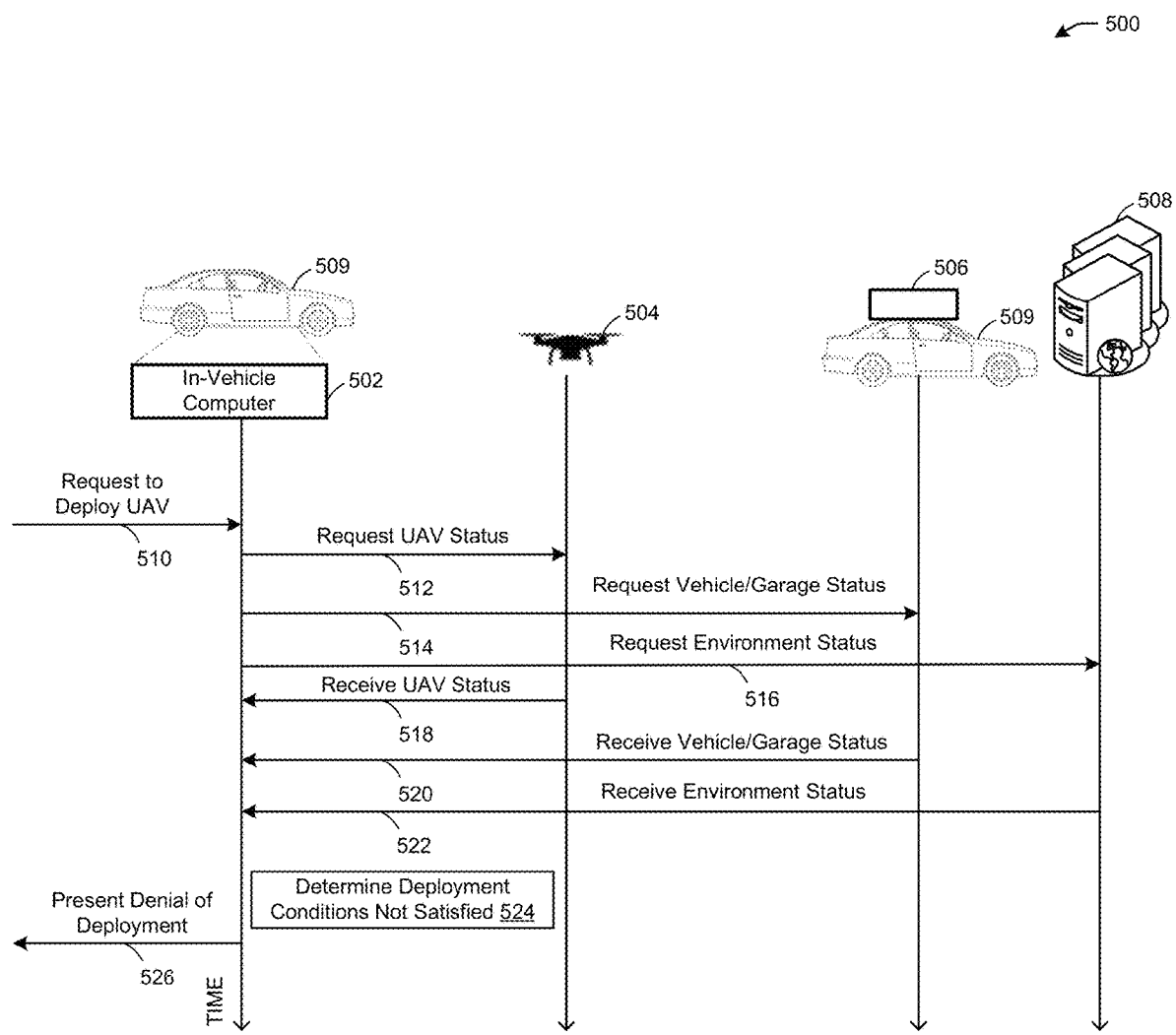
FIG. 5 illustrates a drone vehicle integration and controls process, in accordance with one or more embodiments of the disclosure.

FIG. 5 illustrates a drone vehicle integration and controls process 500, in accordance with one or more embodiments of the disclosure.

Referring to FIG. 5, an in-vehicle computer 502 (e.g., which may be similar to the in-vehicle computer 208 of FIG. 2) may be in communication with a UAV 504, a garage 506 for vehicle storage of the UAV 504 on a vehicle 509, and one or more servers 508. The drone vehicle integration and controls process 500 may facilitate storage, deployment, and landing of the UAV 504, control the garage 506, and control of the vehicle 509.

At step 510, the in-vehicle computer 502 may receive in input indicating a request to deploy the UAV 504. The input may be a touch, a gesture, a voice command, a wireless signal, or other type of input.

At step 512, the in-vehicle computer 502 may send a request for status of the UAV 504. The request may be sent to the UAV 504 and may include a request for power status of the UAV 504 and other parameters of the UAV 504 associated with an ability of the UAV 504 to fly.

At step 514, the in-vehicle computer 502 may send a request for a status of the garage 506 and or the UAV 504. The request may be sent to the garage 506 and the UAV 504, and may include a request for status of the garage 506 and the UAV 504. For example, the request may include a request for whether the UAV 504 is secured in the garage 506 and whether the garage 506 is open or closed, whether the UAV 504 is charging, whether the UAV 504 is locked, or the like.

At step 516, the in-vehicle computer 502 may send a request for a status of the environment. The request may include a request for weather information, location information, regulatory information and restrictions, and the like. The request may be sent to the one or more servers 508.

At step 518, the in-vehicle computer 502 may receive a status of the UAV 504, which may indicate whether or not the UAV 504 is present, charged, and ready to deploy. The status may indicate current, voltage, signal strength, and the quality of a tether if the UAV 504 is wired to the vehicle 509. [01.18] At step 520, the in-vehicle computer 402 may receive a status of the UAV 504 and the garage 506. The status may indicate whether or not the UAV 504 is present, charged, and ready to deploy, and whether or not the garage 506 is ready to release the UAV 504 for takeoff.

At step 522, the in-vehicle computer 502 may receive an environmental status such as weather indications, environmental or flight restrictions, a type of area (e.g., urban, populated, rural, etc.).

At step 524, the in-vehicle computer 502 may determine that deployment conditions are not satisfied for the deployment of the UAV 504. In one or more embodiments, the in-vehicle computer 502 may consider any combination of information related to the UAV 504, the garage 506, the vehicle 509, and the environment to determine whether or not the UAV 504 may be deployed, and under what conditions. The in-vehicle computer 502 may determine that any combination of information meets suitable conditions for the UAV 504 to deploy, however, the in-vehicle computer 502 may determine that not all criteria is met to allow for deployment of the UAV 504. For example, the in-vehicle computer 502 may determine that environmental conditions and restrictions are suitable for deployment of the UAV 504, but that the vehicle 509 is moving at a speed that is unsafe for deployment. The in-vehicle computer 502 may determine that the vehicle 509 is stopped and the UAV 504 is in suitable condition for deployment, but that the weather is poor or the surrounding area is restricted.

At step 526, the in-vehicle computer 502 may present a denial of deployment indication. For example, the in-vehicle computer 502 may indicate which conditions are not being met to allow for deployment of the UAV 504, and may present instructions to a driver or passenger. For example, the in-vehicle computer 502 may cause presentation of an indication that the vehicle 509 needs to be stopped or operating at a slower speed, that the weather needs to improve, that the vehicle 509 needs to move to an unrestricted location, that the UAV 504 needs to be charged, or another indication communicating why the UAV 504 may not be deployed.

Figure 6:
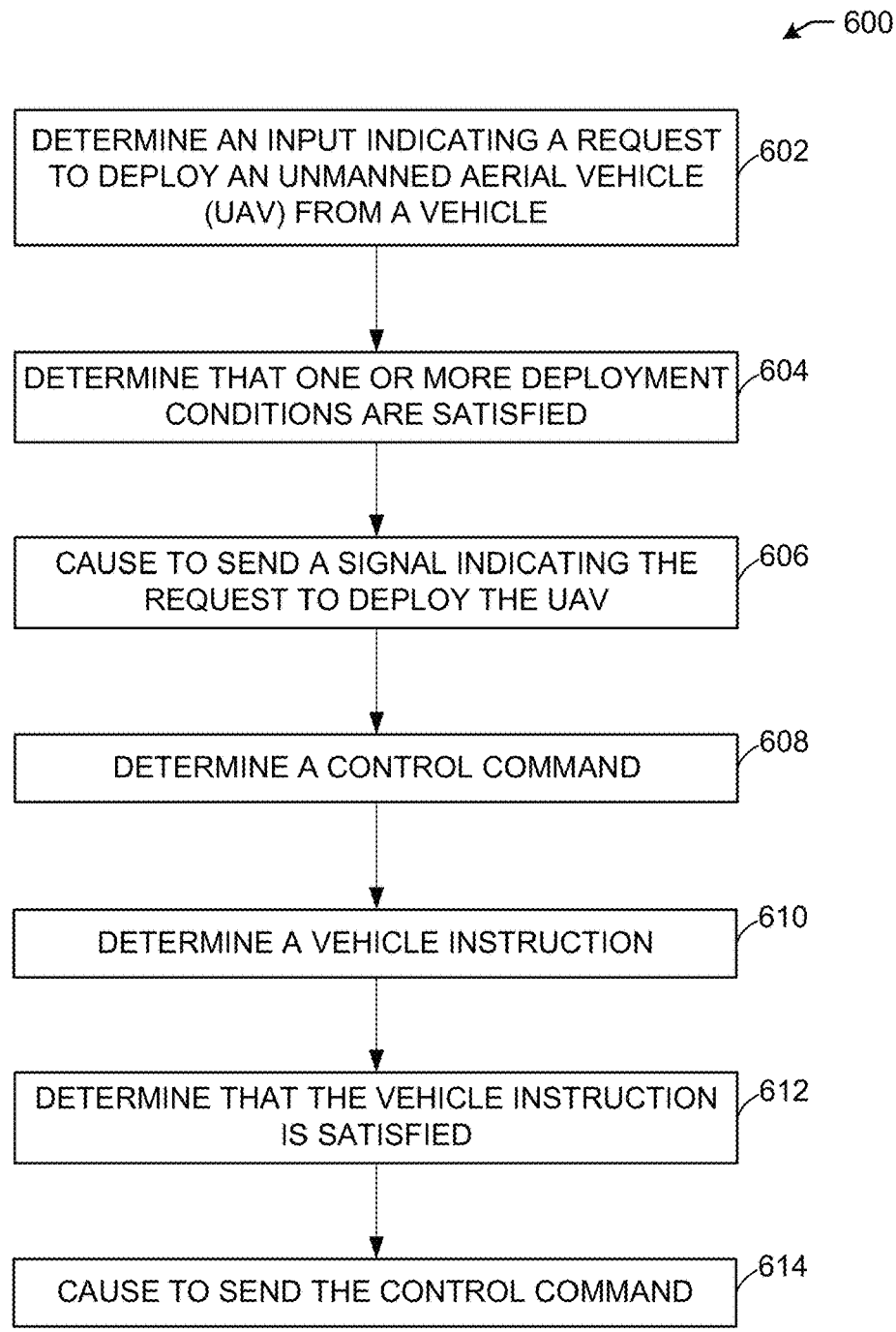
FIG. 6 illustrates a flow diagram for a process of controlling a drone with a vehicle computer system, in accordance with one or more example embodiments of the present disclosure.

FIG. 6 illustrates a flow diagram for a process 600 of controlling a drone with a vehicle computer system, in accordance with one or more example embodiments of the present disclosure. [01.23] At block 602, a computing device (e.g., the in-vehicle computer 208 of FIG. 2) may determine an input indicating a request to deploy the UAV from a vehicle (e.g., step 410 to deploy the UAV 404 from the vehicle 409 in FIG. 4). The input may indicate whether a user is a driver or passenger of a vehicle, and whether the user is a driver is a passenger may determine the deployment parameters for the UAV. For example, if the driver requests use of the UAV, then the vehicle may need to stop or be moving slower than if a passenger requests control of the UAV.

At block 604, the computing device may determine that one or more deployment conditions are satisfied. The deployment conditions may be conditions associated with deployment and operation of the UAV, and may include UAV status, status of the vehicle, status of a garage (e.g., garage 406 of FIG. 4) housing the UAV, location information, weather, regulatory restrictions, and the like. The deployment conditions may be dependent on a type of UAV, a location, a time of day, information about the user, the type of vehicle, or the like. Any combination of information related to the vehicle, UAV, and surrounding environment may be used to limit UAV usage. Therefore, even if some deployment conditions are met (e.g., the vehicle is stopped and the weather is suitable), other deployment conditions may not be met (e.g., the UAV is not charged or the signal between the computing device and the UAV is not strong enough for deployment). Deployment conditions may be pre-programmed and/or updated based on previous deployment and flight information. If the deployment conditions are not met at any time, the computing device may cause presentation of an indication of a denial, and may present instructions for changing conditions to allow for a UAV to be deployed. The computing device may first determine that conditions are not suitable for deployment, but may later determine that deployment conditions are satisfied.

At block 606, the computing device may send one or more signals which may cause deployment of the UAV if the deployment conditions are met. Causing deployment of the UAV may include sending one or more signals to the garage and/or UAV to cause release of the UAV. The signals may also include control signals and commands instructing the UAV how to operate (e.g., takeoff, ascend, descend, move in a particular direction, etc.). The signals may be based on received user inputs or may be sent automatically based on determinations made by the computing device. The one or more signals may include a command to the garage to open and decouple/detach/unlock the UAV so that the UAV may be released from the garage.

At block 608, the computing device may determine a control command received from a user. The control command may indicate a manual control mode request associated with allowing a manual flight mode in which a user in the vehicle may command the UAV through the computing device. The commands may include instructions for the UAV commanding the UAV to move a certain way, travel to a particular location, return to the vehicle (e.g., a landing command), capture video, images, or sound, and the like. The computing device may determine and send commands autonomously to control the UAV, whether in an autonomous mode or manual mode. For example, even in manual mode, the computing device may determine that the UAV needs to change course or return to the vehicle and may send such commands.

At block 610, the computing device may determine a vehicle instruction associated with allowing manual control of the UAV. For example, to allow a driver or passenger to control the UAV, the vehicle may need to slow down or stop. The computing device may determine a suitable speed, location, and any combination of operating parameters suitable for allowing a user to control the UAV. The computing device may cause presentation of such instructions so that, for example, a driver of the vehicle may implement the instructions to allow for safe control of the UAV.

At block 612, the computing device may determine that vehicle instructions are satisfied. For example, if the vehicle needs to slow down or stop to allow for user control of the UAV, the computing device may determine that the vehicle has stopped or reached suitable speed to send the user commands to control the UAV. Alternatively, the computing device may autonomously cause the vehicle to adjust operating parameters (e.g., slow down or stop) before sending manual user commands to the UAV.

At block 614, the computing device may send the control commands to the UAV. The control commands may correspond to user inputs for manual controls and/or to commands determined and generated by the computing device autonomously. The computing device may withhold sending manual commands until the vehicle has satisfied the instructions. [01.30] In one or more embodiments, the information considered for deployment conditions may be stored locally (e.g., in the storage 212 of FIG. 2) and/or retrieved from one or more cloud servers or databases (e.g., servers 228 of FIG. 2). The information may update periodically or continuously as it is received from external information sources or from vehicle sensors (e.g., sensor(s) 220 of FIG. 2). The criteria used for determining whether deployment conditions are satisfied may be stored or retrieved, and may update based on information collected and analyzed from UAV usage.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. [01.34] A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims. [01.40] The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A vehicle device for controlling an unmanned aerial vehicle (UAV), the vehicle device comprising storage and circuitry configured to:
   receive a speed of a vehicle hosting the vehicle device;
   receive a first input indicating a request to deploy the UAV from the vehicle, wherein when the speed of the vehicle is other than zero the first input further indicates a particular operator making the first input;
   determine whether a first deployment condition of two deployment conditions is satisfied, wherein the first deployment condition of the two deployment conditions includes that the speed of the vehicle is zero;
   when the first deployment condition of the two deployment conditions is determined to not be satisfied, determine a seat location of the particular operator in the vehicle and whether a seatbelt at the seat location of the particular operator is buckled, wherein a second deployment condition of the two deployment conditions includes that the seat location is not a seat of a driver, that the particular operator is not the driver, and that the seatbelt at the seat location of the particular operator is buckled;
   when the first deployment condition or the second deployment condition of the two deployment conditions is satisfied:
      transmit a first signal to the UAV indicating the request to deploy the UAV from a roof of the vehicle or a garage associated with the roof;
      transmit a second signal to the roof or the garage that causes the roof or the garage to open based on the request to deploy the UAV;
      receive, from the particular operator, a second input in the form of a control command associated with operating the UAV after deployment; and
      transmit, to the UAV, a third signal indicative of the control command that causes the UAV to deploy from the roof or the garage.

2. The vehicle device of claim 1, wherein the second deployment condition of the two deployment conditions further includes that the speed of the vehicle is at or below a predetermined threshold vehicle speed, wherein the predetermined threshold vehicle speed is greater than zero.

3. The vehicle device of claim 1, wherein, when the vehicle speed is zero, the first input further indicates one or more of the following:
   the particular operator making the first input;
   whether the request is coming from the driver of the vehicle or a non-driver passenger of the vehicle,
   the seat location in the vehicle that is associated with the request, and/or
   whether the seatbelt associated with the seat location in the vehicle associated with the request is buckled.

4. The vehicle device of claim 1, wherein the control command is associated with manual control of the UAV.

5. The vehicle device of claim 1, wherein, when the speed of the vehicle is other than zero, the indication of the particular operator making the first input further includes one or more of the following:
   whether the particular operator is the driver of the vehicle or a non-driver passenger of the vehicle,
   the seat location in the vehicle of the particular operator, and/or
   whether the seatbelt associated with the seat location in the vehicle of the particular operator in the vehicle is buckled.

6. The vehicle device of claim 1, the circuitry being further configured to:
   receive weather information from a first server;
   receive flight restriction information from a second server;
   determine whether the weather information and the flight restriction information satisfy one or more UAV flight requirements; and
   wherein the first deployment condition and the second deployment condition of the two deployment conditions further include that the one or more UAV flight requirements be satisfied.

7. The vehicle device of claim 1, the circuitry being further configured to receive data indicating one or more of the following:
   whether the UAV is in the vehicle or the garage;
   whether stored power of the UAV satisfies a power threshold for deployment; and/or
   whether a signal strength between the vehicle device and the UAV meets a signal strength threshold; and
   wherein the first deployment condition and the second deployment condition of the two deployment conditions further include that the received data indicates one or more of the following:
   that the UAV is in the vehicle or the garage:
   that the stored power of the UAV satisfies the power threshold for deployment; and/or
   that the signal strength between the vehicle device and the UAV meets a signal strength threshold.

8. The vehicle device of claim 1, the circuitry being further configured to:
   receive an indication of a location of the UAV, the vehicle, and/or the vehicle device; and
   determine whether the location satisfies one or more UAV flying restrictions; and
   wherein the first deployment condition and the second deployment condition of the two deployment conditions further include that the location satisfies the one or more flying restrictions.

9. The vehicle device of claim 1, the circuitry being further configured to:
   receive UAV condition data associated with a condition of the UAV;
   receive environmental condition data associated with an environmental condition external to the vehicle; and
   determine whether the UAV condition data and the environmental condition data indicate that the condition of the UAV is above a UAV condition standard and the environmental condition external to the vehicle is above an environmental condition standard; and
   wherein the first deployment condition and the second deployment condition of the two deployment conditions further include that the condition of the UAV is above the UAV condition standard and the environmental condition external to the vehicle is above the environmental condition standard.

10. The vehicle device of claim 1, the circuitry being further configured to:
    when the first deployment condition and the second deployment condition of the two deployment conditions are not satisfied, cause a display of the vehicle to present an indication that the UAV may not be deployed; and
    when the first deployment condition of the two deployment conditions is satisfied but the second input has not yet been received, determine whether the speed of the vehicle has changed, and when it is determined that the speed of the vehicle has changed, determine whether the second deployment condition of the two deployment conditions is satisfied, and when the second deployment condition of the two deployment conditions is not satisfied, cause the display of the vehicle to present the indication.

11. The vehicle device of claim 4, wherein the manual control of the UAV further includes at least one additional control command associated with initializing at least one of a landing instruction, a navigation instruction, and/or a camera control.

12. The vehicle device of claim 4, wherein the manual control of the UAV further includes at least one additional control command associated with an instruction for initializing the UAV to follow the vehicle; and
    wherein, when the at least one additional control command is associated with the instruction for initializing the UAV to follow the vehicle, the circuitry is further configured to transmit a fourth signal to a speed controller of the vehicle, the fourth signal activating an operational mode of the vehicle to limit the speed of the vehicle to a maximum traveling speed of the UAV.

13. The vehicle device of claim 1, wherein the circuitry is further configured to:
    when the speed of the vehicle is other than zero and the first input has been received, receive at least one sensor input from at least one sensor in the vehicle;
    determine whether the at least one sensor input indicates that the seat location is not the seat of the driver, that the particular operator is not the driver, and that the seatbelt at the seat location of the particular operator is buckled; and
    when the at least one sensor input indicates that the seat location is not the seat of the driver, that the particular operator is not the driver, and that the seatbelt at the seat location of the particular operator is buckled, cause a display of the vehicle to present an indication that deployment of the UAV is permitted based on the particular operator of the vehicle wearing the seatbelt.

14. The vehicle device of claim 1, wherein the circuitry is further configured to:
    receive operational data indicative of at least one of:
    a network status of the vehicle,
    an open or close status of the roof or the garage,
    an altitude of the UAV after deployment,
    a heading of the UAV after deployment,
    a battery power, voltage, or current associated with the UAV,
    an indication of one or more Global Positioning System (GPS) satellites, and/or
    a video live stream associated with the UAV after deployment; and
    cause a display of the vehicle to present the operational data.

15. The vehicle device of claim 1, wherein the UAV is a first UAV out of a plurality of UAVs associated with the vehicle; and
    wherein determining whether the first deployment condition or the second deployment condition of the two deployment conditions is satisfied further comprises determining whether the first deployment condition or the second deployment condition of the two deployment conditions is satisfied for each of the plurality of UAVs associated with the vehicle, and when the first deployment condition or the second deployment condition of the two deployment conditions is satisfied for more than one of the plurality of UAVs, selecting a particular one of the plurality of UAVs to serve as the UAV and an associated roof or garage of the particular one of the plurality of UAVs serving as the UAV, sending the first signal and the third signal to the particular one of the plurality of UAVs selected to serve as the UAV, and sending the second signal to the associated roof or garage of the particular one of the plurality of UAVs selected to serve as the UAV.

16. A non-transitory computer-readable medium storing computer-executable instructions which when executed by one or more processors result in performing operations comprising:
  receiving, at a vehicle device, a speed of a vehicle hosting the vehicle device;
  receiving, at the vehicle device, a first input indicating a request to deploy an unmanned aerial vehicle (UAV) from the vehicle, wherein when the speed of the vehicle is other than zero the first input further indicates a particular operator making the first input;
  determining whether a first deployment condition of two deployment conditions is satisfied, wherein the first deployment condition of the two deployment conditions includes that the speed of the vehicle is zero;
  when the first deployment condition of the two deployment conditions is determined to not be satisfied, determining a seat location of the particular operator in the vehicle and whether a seatbelt at the seat location of the particular operator is buckled, wherein a second deployment condition of the two deployment conditions includes that the seat location is not a seat of a driver, that the particular operator is not the driver, and that the seatbelt at the seat location of the particular operator is buckled:
  when the first deployment condition or the second deployment condition of the two deployment conditions is satisfied:
    transmitting a first signal to the UAV indicating the request to deploy the UAV from a roof of the vehicle or a garage associated with the roof;
    transmitting a second signal to open the roof or the garage that causes the roof or the garage to open based on the request to deploy the UAV;
    receiving, from the particular operator, a second input in the form of a control command associated with operating the UAV after deployment; and
    transmitting, to the UAV, a third signal indicative of the control command that causes the UAV to deploy from the roof or the garage.

17. The non-transitory computer-readable medium of claim 16, wherein the second deployment condition of the two deployment conditions further includes that the speed of the vehicle is at or below a predetermined threshold vehicle speed, wherein the predetermined threshold vehicle speed is greater than zero.

18. The non-transitory computer-readable medium of claim 16, wherein, when the vehicle speed is zero, the first input further indicates one or more of the following:
  the particular operator making the first input;
  whether the request is coming from the driver of the vehicle or a non-driver passenger of the vehicle,
  the seat location in the vehicle that is associated with the request, and/or
  whether the seatbelt associated with the seat location in the vehicle associated with the request is buckled.

19. The non-transitory computer-readable medium of claim 16, wherein the control command is associated with manual control of the UAV.

20. A method, comprising:
  receiving, by circuitry of a vehicle device, a speed of a vehicle hosting the vehicle device:
  receiving, by the circuitry, a first input indicating a request to deploy an unmanned aerial vehicle (UAV) from the vehicle, wherein when the speed of the vehicle is other than zero the first input further indicates a particular operator making the first input;
  determining, by the circuitry, whether a first deployment condition of two deployment conditions is satisfied, wherein the first deployment condition of the two deployment conditions includes that the speed of the vehicle is zero;
  when the first deployment condition of the two deployment conditions is determined to not be satisfied, determining a seat location of the particular operator in the vehicle and whether a seatbelt at the seat location of the particular operator is buckled, wherein a second deployment condition of the two deployment conditions includes that the seat location is not a seat of a driver, that the particular operator is not the driver, and that the seatbelt at the seat location of the particular operator is buckled:
  when the first deployment condition or the second deployment condition of the two deployment conditions is satisfied:
    transmitting, by the circuitry, a first signal to the UAV indicating the request to deploy the UAV from a roof of the vehicle or a garage associated with the roof;
    transmitting, by the circuitry, a second signal to open the roof or the garage that causes the roof or the garage to open based on the request to deploy the UAV;
    receiving from the particular operator, by the circuitry, a second input in the form of a control command associated with operating the UAV after deployment; and
    transmitting to the UAV, by the circuitry, a third signal indicative of the control command that causes the UAV to deploy from the roof or the garage.

* * * * *